United States Patent [19]
Jackson

[11] 3,753,629
[45] Aug. 21, 1973

[54] COMBINATION HYDRAULIC MOTOR DRIVEN HYDRAULIC PUMP AND AIR COMPRESSOR ASSEMBLY

[75] Inventor: George W. Jackson, Dayton, Ohio

[73] Assignee: General Motors Corporation, Detroit, Mich.

[22] Filed: Apr. 28, 1972

[21] Appl. No.: 247,325

[52] U.S. Cl. ............................. 417/388, 417/406
[51] Int. Cl. ..................... F04b 9/10, F04b 35/02
[58] Field of Search..................... 417/385, 388, 390, 417/405, 406, 383, 384, 204

[56] References Cited
UNITED STATES PATENTS
2,660,123 11/1953 Vlachos ......................... 417/406 X
3,696,614 10/1972 Hartmann et al. ................. 417/390

Primary Examiner—Carlton R. Croyle
Assistant Examiner—Richard Shek
Attorney—Frank J. Soucek and Charles R. Engle

[57] ABSTRACT

A hydraulic pump driven by a reaction motor energized by pressurized fluid, in one application, from a vehicle power steering system. The hydraulic motor includes a reaction rotor driving a pump rotor. Hydraulic fluid is pressurized by the pump and applied against one side of a diaphragm air compressor. The diaphragm responds to inlet and discharge pulses in the hydraulic pump pressurizing air in a chamber on the other side of the diaphragm. Inlet and exhaust valves are associated with the air pressurizing chamber regulating flow of inlet air into and discharge of pressurized air out of the chamber during cyclic operation of the pump. In preferred form; the motor, pump and diaphragm compressor are incorporated into an integral unit and air pressurized by the compressor is supplied to a vehicle leveling system.

3 Claims, 8 Drawing Figures

Patented Aug. 21, 1973

COMBINATION HYDRAULIC MOTOR DRIVEN HYDRAULIC PUMP AND AIR COMPRESSOR ASSEMBLY

This invention relates to a combined assembly including a hydraulic reaction motor driving a hydraulic pump which in turn actuates a diaphragm air compressor. More specifically, this invention relates to such a combination receiving pressurized hydraulic fluid from a vehicle power steering system and actuating a diaphragm compressor supplying pressurized air to an automatic vehicle leveling system.

Provision of compressed air in automatic vehicle leveling systems has, in the past, necessitated use of electrically powered or vehicle engine powered compressors. The structure of this invention results in a more efficient method of providing a source of compressed air required in an automatic vehicle leveling system by using an existing supply of fluid under pressure. The combination hydraulic motor, pump and diaphragm air compressor of this invention could, of course, be used in any environment where a source of pressurized hydraulic fluid is available to energize the hydraulic reaction motor. The hydraulic pump receives and pressurizes fluid for application against one side of the diaphragm air compressor. The diaphragm is responsive to the suction or inlet fluid cycle of the pump on one side thereof and draws air into an air chamber on the other side of the diaphragm during the inlet cycle. During the pump pressure cycle, pressurized fluid is transmitted through appropriate passages to the fluid side of the diaphragm moving it to decrease the volume of the air chamber, pressurizing air therein and forcing it through an exhaust valve to either a pressure supply tank or directly to a vehicle leveling system as conditions of the system may require. Since the combined unit of this invention utilizes pressurized fluid from an existing system for the energization thereof, the necessity of providing an additional power source is eliminated thereby also eliminating the consequent added inefficiencies associated with an additional power source.

Accordingly, a first object of this invention is the provision of a hydraulic reaction motor, a hydraulic pump and a diaphragm air compressor as a single unit reducing the number of required components to a minimum while eliminating plumbing therebetween.

Another object of this invention is the provision of a hydraulic reaction motor receiving pressurized hydraulic fluid from a vehicle power steering system driving a hydraulic pump cycling a diaphragm air compressor.

A further object of this invention is the provision of a hydraulic reaction motor responding to pressurized hydraulic fluid from an external source driving a hydraulic pump pressurizing fluid and providing means for applying the pressurized fluid against a diaphragm air compressor for supplying pressurized air to an automatic vehicle leveling system.

These and other objects will be more apparent from the following detailed description of a preferred embodiment of my invention taken in connection with the accompanying drawings wherein:

Figure 1:
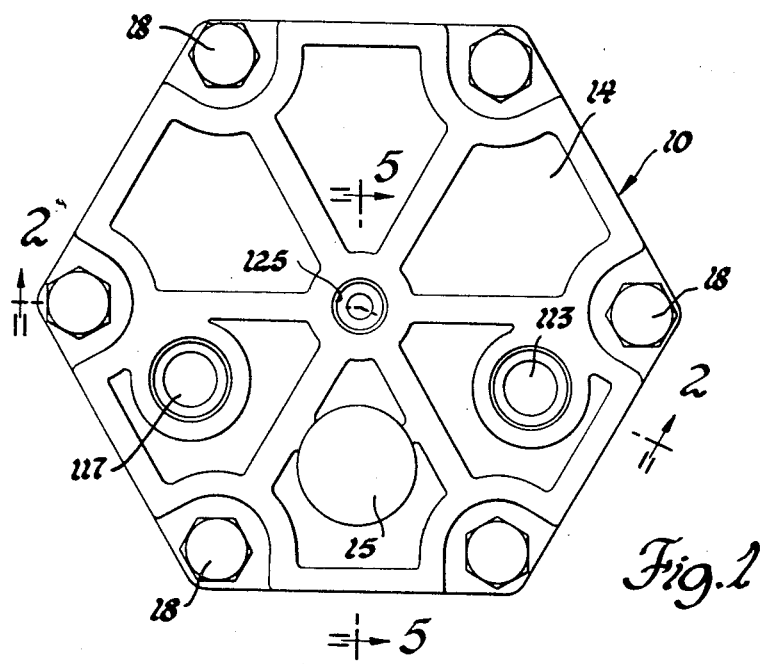
FIG. 1 is an end plan view of the subject hydraulic reaction motor, hydraulic pump and diaphragm air compressor assembly.
Figure 2:
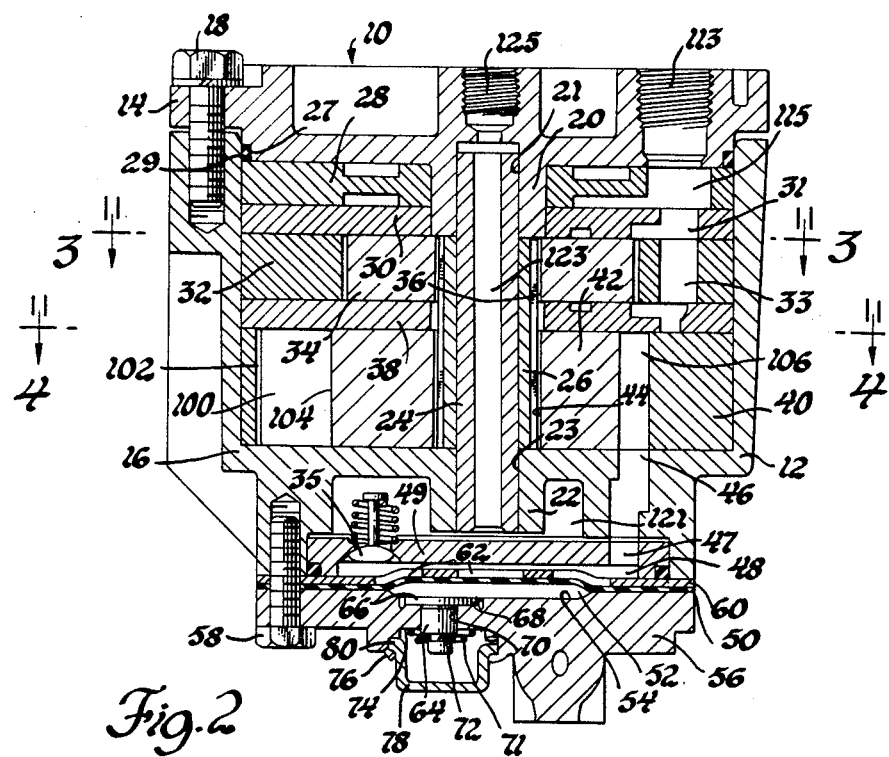
FIG. 2 is a cross-sectional view taken on line 2—2 of FIG. 1.
Figure 3:
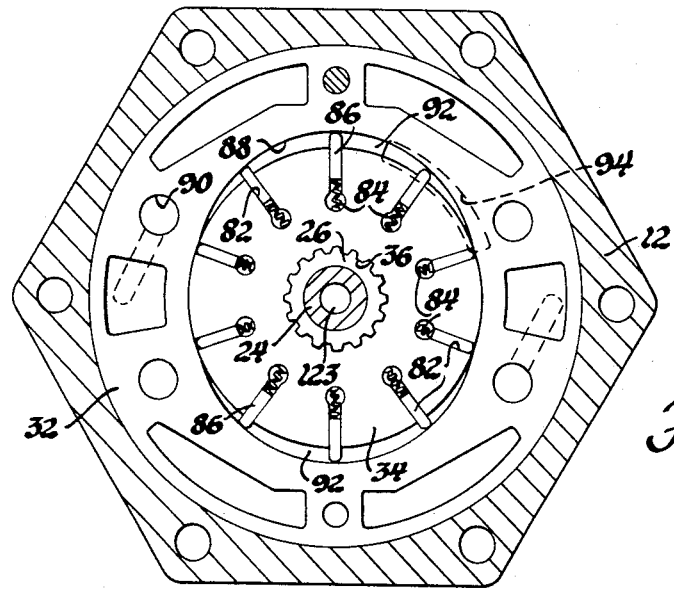
FIG. 3 is a cross-sectional view taken on line 3—3 of FIG. 2.

With reference to FIG. 1, the hydraulic reaction motor, pump and diaphragm air compressor assembly 10 of my invention is shown in end plan view. As best shown in FIG. 2, the assembly 10 includes a housing 12 having a removable end plate 14 and an integral end plate 16, the removable end plate 14 being secured to the housing 12 by a plurality of threaded bolts 18. The end plate 14 is formed including an annular flange 20 while the end plate 16 is formed including a similar annular flange 22 providing journal bearing surfaces 21 and 23, respectively, receiving a stationary shaft 24. An annular groove 27 is provided in the end plate 14, adjacent housing 12 and transfer plate 28, and receives an O-ring seal 29 preventing leakage of fluid exteriorly of the housing. A splined sleeve 26 is free to rotate on the exterior surface of shaft 24 and extends between the flanges 20 and 22 of the end plates for rotation therebetween. A transfer plate 28 is concentrically received upon the flange 20. A first porting plate 30 is also positioned upon the flange 20 in contact with the transfer plate 28 for a purpose later to be described. An annular stator 32 is received within housing 12 adjacent the first porting plate 30 and has its outer circumferential surface in fixed engagement with the housing 12. A fluid reaction rotor 34, having an internally splined opening 36, shown in FIG. 3, is mounted on the splined sleeve 26 for rotation therewith. The rotor 34 is positioned to rotate within the stator 32. A second porting plate 38, a mirror image of the plate 30, is positioned adjacent stator 32 and the fluid reaction rotor 34. The porting plates, stator and reaction rotor, all cooperate forming a fluid motor assembly as is well known in the art.

A pump stator 40 is also retained within the housing 12 in fixed relationship therewith and is positioned in engagement with end plate 16. A pump rotor 42 contains a splined opening 44, similar to opening 36 in reaction rotor 34, and likewise is received upon the sleeve 26 for rotation on stationary shaft 24. The pump stator 40 and rotor 42 cooperate forming a pump assembly discharging pressurized fluid through a passage 46 in integral end plate 16 and an opening 47 in a fluid control plate 49 to a fluid chamber 48 on one side of an air compressor diaphragm 50. An air pressurizing chamber 52 is defined on the other side of the diaphragm 50 by the diaphragm and a machined portion 54 in an air valve plate 56. The air valve plate 56 is secured to the integral end plate 16 by a plurality of screws 58 as shown. A metal diaphragm back-up plate 60 containing apertures 62 is retained between the air valve plate 56 and end plate 16 by the screws 58. An air inlet valve 64 includes an annular flange 66 received in a recess 68 in the valve plate 56. The valve 64 extends through an aperture 70 in plate 56 and is retained therein by a spring 71 engaging an annular valve groove 72. The air valve plate 56 is cast or otherwise formed to include an annular recess 74 having a deformable lip 76 therearound. A valve cover and conduit assembly 78 is received in the recess 74 and is retained therein by crimping the lip 76 against flanges 80 of the cover and conduit assembly 78.

As is best illustrated in FIG. 3, the fluid reaction rotor 34 contains a plurality of radially extending slots 82 receiving springs 84 biasing vanes 86 outwardly against the inner circumferential surface 88 of stator 32. The rotor 34 and its slidable vanes 86 receive pressurized fluid from the vehicle power steering system through a supply passage 90 causing rotation of the rotor clockwise as viewed in FIG. 3. The fluid is discharged from rotor stator chamber 92 through a passage 94 where it eventually returns to the power steering system, not shown.

Figure 4:
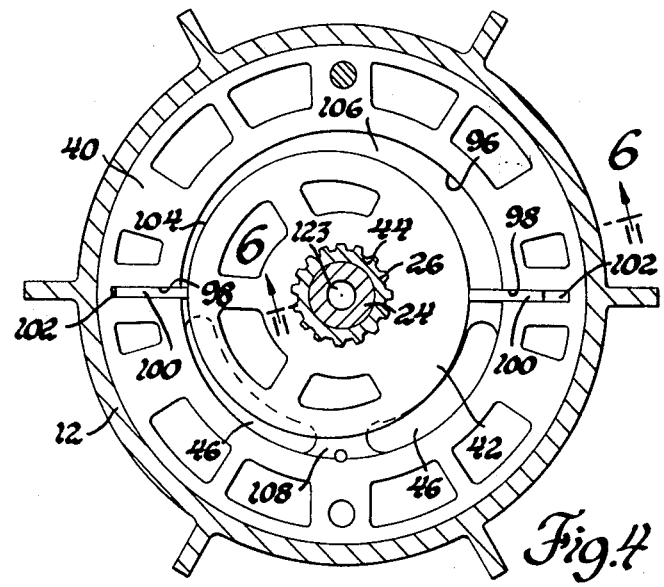
FIG. 4 is a cross-sectional view taken on line 4—4 of FIG. 2.

Referring now to FIG. 4, the pump rotor 42 includes the previously mentioned plined opening 44 by which it is also received upon the sleeve 26 for rotation on stationary shaft 24. The rotor 42 is eccentrically mounted with respect to an opening defined by inner surface 96 of stator 40. The stator 40 contains diametrically opposed radially extending slots 98 receiving slidable vanes 100. The stator 40 is ported such that pressurized fluid is continuously applied to chambers 102 on the outer sides of the vanes 100 continuously urging them into engagement with outer surface 104 of the rotor. Inner surface 96 of stator 40 and outer surface 104 of pump rotor 42 define a fluid inlet non-pumping chamber 106 above the diametrically oppositely positioned vanes 100 and a similar chamber 108 in the lower half of the structure which is in fluid connection with passages 46 which supplies pressurized fluid to and withdraws fluid from chamber 48 on the upper side of diaphragm 50 as shown in FIG. 2. The non-pumping chamber 106 is connected to an outlet 117 returning fluid to the power steering sump.

Figure 5:
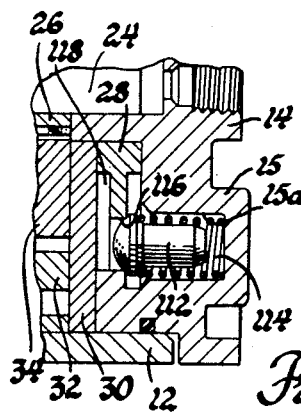
FIG. 5 is a fragmentary cross-sectional view taken on line 5—5 of FIG. 1.

With reference to FIG. 5, a portion of the removable end plate 14 is shown including a boss 15 formed thereon, the latter containing a cylindrical machined cavity 15a. A pressure relief valve 112 is placed in the cavity 15a and is biased by a spring 114 against a valve seat 116 normally blocking flow through aperture 118 in transfer plate 28. Again referring to FIGS. 1 and 2, pressurized inlet fluid is received from the power steering system via port 113 in end plate 14 and enters an annular passage 115 in the transfer plate 28. The pressurized fluid is applied against valve 112, which opens to return the fluid to the power steering system sump through outlet 117 in FIG. 1 upon the occurrence of excessive inlet pressure. As previously mentioned, outlet 117 also conducts flow from chamber 106 to the sump. The purpose of the valve 112 therefore, is to prevent high fluid pressure damage to the subject assembly should the reaction motor, hydraulic pump and diaphragm compressor assembly stall for some reason such as a bearing failure. Utilization of the valve 112 bypasses the assembly under these circumstances without interferring with the normal operation of the power steering system.

Figure 6:
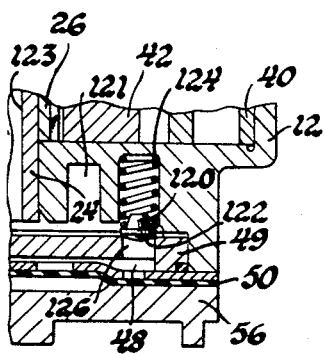
FIG. 6 is a fragmentary cross-sectional view taken on line 6—6 of FIG. 4.

In FIG. 6, a valve 120 is biased into engagement with a valve seat 122 in plate 49 by a spring 124. The valve 120 is in fluid connection with diaphragm air compressor fluid chamber 48 via a passage 126. Valve 120 is operative to limit the maximum air pressure supplied by the diaphragm 50 by virtue of its limiting the pressure of the oil supplied directly against the diaphragm as will be later explained. This feature is accomplished by the valve 120 responding to excess pressure and exhausting fluid into chamber 121 from which the fluid flows through passage 123 in shaft 24 to port 125 which connects with a conduit to a hydraulic fluid reservoir, not shown.

Figure 7:
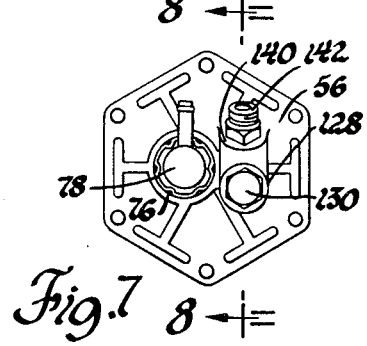
FIG. 7 is an end plan view of the air compressor valve plate of the subject invention.
Figure 8:
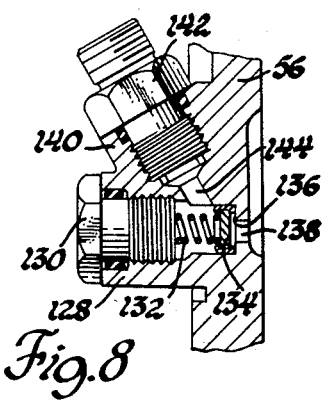
FIG. 8 is an enlarged fragmentary cross-sectional view taken on line 8—8 of FIG. 7.

Referring now to FIGS. 7 and 8, the air valve plate 56 includes the valve cover and conduit assembly 78 which is retained by the crimped-over rim 76. The plate 56 also includes an axially extending boss 128 threadably receiving a plug 130 retaining a spring 132 biasing an exhaust valve 134 closed against a valve seat 136. The valve 134 is operative to close an air exhaust passage 138. An angularly extending boss 140 is also formed on the air valve plate 56 and threadably receives a fitting 142 connecting with an angularly extending passage 144 in fluid connection with passage 138 when exhaust valve 134 is opened. The fitting 142 is connected with a supply line, not shown, to convey pressurized air to vehicle lift units in an automatic vehicle leveling system, also not shown.

In operation, pressurized fluid from the vehicle power steering system enters passage 113 in end plate 14 and flows into chamber 115 in transfer plate 28. Transfer plate 28 and the porting plate 30 direct the fluid through aperture 31 into aperture 33 in stator 32 wherein it is guided by passages, not shown, and applied against vanes 86 rotating reaction rotor 34 in a clockwise direction.

Clockwise rotation of the reaction rotor 34 rotates splined sleeve 26 on the shaft 24 driving pump rotor 42 within stator 40. The eccentric rotation of rotor 42, while being continuously engaged by the fluid biased vanes 100, causes pressurization of fluid in chamber 108 due to the space between the rotor and the stator decreasing in the lower half of the assembly in FIG. 4. The pressurized fluid exits chamber 108 and flows through passages 46 and 47, in end plate 16 and valve plate 49, respectively, into fluid chamber 48 on the upper side of diaphragm 50, best shown in FIG. 2.

The diaphragm 50 is responsive to the inlet and pressurizing cycles of the pump rotor 42 and accordingly is raised to increase the volume and draw air into chamber 52 through valve 64 during the inlet cycle and is lowered to decrease the volume pressurizing air during the pump fluid pressurizing cycle. Hydraulic fluid is supplied to chamber 48 through make-up valve 35 so as to maintain the chamber filled. It is necessary that the chamber 48 be completely filled so that the air diaphragm 50 will be fully responsive to the pressure pulses from the hydraulic pump assembly including the stator 40 and rotor 42. The chamber 52 and displacement of pump rotor 42 into chamber 108 are sized so that diaphragm 50 bottoms in chamber 52 assuring positive pressurization of the air therein. The hydraulic relief valve 120, shown in FIG. 6, prevents excessive pressure being applied to the diaphragm 50 by exhausting fluid into chamber 121, FIG. 6, when a predetermined pressure is exceeded.

It has been found that a vehicle power steering system employing an open center control valve will in its neutral valve position be circulating hydraulic fluid in a pressure range of 45-75 psi. In a slow vehicle speed turn or during a parking maneuver wherein the control valve is moved closed, pressure of fluid in the system may be as high as 500-600 psi. Maximum fluid pressure is obtained if a wheel engages a curb or a like fixed object, this pressure being 1,000 psi. Normal vehicle use results in fluid pressures in the range of 100–500 psi depending upon vehicle speed and angle of turning.

My invention, as described above, is designed to accommodate all of these conditions. By including the pressure relief valve 112, the combined reaction motor, fluid pump and air compressing diaphragm 50 can accommodate all operational extremes, including the range of fluid pressures, of the power steering system while efficiently storing or directly supplying pressurized air to the automatic vehicle leveling system.

While I have shown and described a specific embodiment of the present invention it will, of course, be understood that alternative forms may be provided without departing from the scope thereof. I, therefore, intend by the appended claims to cover all such modifications and alternative constructions falling within their definitive scope.

I claim:

1. A mechanism to compress air oil free from a source of oil under pressure, comprising; a housing having a cylindrical bore, said cylindrical bore having a first closed end, a first stator secured in said bore adjacent said first closed end, a fluid motor comprising a first rotor rotatably disposed within said first stator, a second stator in said bore and a second rotor cooperable with said second stator and defining in conjunction therewith a fluid pump having a pulsating action, means defining a second closed end of said bore opposite to said first closed end and adjacent the pump, plate means secured to said housing at said second closed end forming a cavity between said housing and said defining means, a diaphragm dividing said cavity into a fluid chamber and an air chamber, and valve means in said plate means responding to the pulsating action of fluid from said pump applied to one side of said diaphragm in the fluid chamber whereby air is drawn into the air chamber of said cavity on the other side of said diaphragm during the intake cycle of said pump and said diaphragm moves in response to the pulsating action of said pump compressing the air during the pressure discharge cycle of said pump.

2. A mechanism to compress air oil free from a source of oil under pressure, comprising; a housing having a cylindrical bore defining an integral flat face at one end of said bore, an end plate secured to said housing at the other end of said bore closing the same, said flat face and said end plate both including axially extending flanges defining axially extending cylindrical cavities, a shaft fixedly mounted in said cavities of said flat face and said end plate flanges, a sleeve member rotatably received upon said stationary shaft, a pump stator fixed in said housing adjacent said integral flat face, a pump rotor secured to said sleeve for rotation therewith within said stator thereby forming a pump assembly, a reaction motor stator secured in said housing, a reaction motor rotor secured to said sleeve for rotation therewith within said stator forming a motor assembly, a fluid directing plate disposed between said end plate and said reaction motor assembly, means in said end plate receiving pressurized fluid from an external source and directing the same through said fluid directing plate to drive said reaction motor rotor and said pump rotor, a diaphragm air compressor assembly defining a diaphragm receiving cavity attached to said integral flat face, a diaphragm in said cavity, fluid from said pump being applied to one side of said diaphragm, and valve means in said air compressor assembly providing for the inlet of air into said cavity on the other side of said diaphragm when said pump is operating in its intake cycle and discharging pressurized air from said cavity when said pump is in its pressurized cycle.

3. A mechanism to compress air oil free from a source of oil under pressure, comprising; a housing having a cylindrical bore having an integral closed end defining a flat face, a removable end plate secured to said housing at the other end of said bore closing said bore, annular flanges extending axially from each of said housing ends defining axially extending cylindrical cavities, a shaft fixedly mounted in said annular flanges, a sleeve rotatably mounted upon said stationary shaft, a valve plate secured to said integral closed end defining a diaphragm receiving cavity therebetween, a diaphragm in said cavity dividing the same into a fluid chamber on one side of said diaphragm and an air chamber on the other side of said diaphragm, an air inlet valve in said valve plate, an air exhaust valve in said valve plate, a pump stator secured in said housing adjacent said integral closed end, a pump rotor fixed on said sleeve for rotation therewith within said pump stator forming a pump assembly, at least one vane slidably mounted in a slot in said pump stator and biased into engagement with the outer circumferential surface of said pump rotor by fluid pressure supplied to the slot, said pump having a pulsating action, a porting plate secured in said housing adjacent said pump assembly, a reaction motor stator secured in said housing adjacent said porting plate, a reaction motor rotor fixed to said sleeve for rotation within said motor stator, a plurality of axially extending slots circumferentially spaced in the outer periphery of said rotor, a spring biased vane slidably received in each of said slots and engaging the inner circumferential surface of said motor stator, said reaction motor stator and rotor forming a motor assembly, a second porting plate secured in said housing adjacent said motor assembly, a fluid directing plate positioned on said annular flange of said end plate between said second porting plate and the end plate, means in said end plate, said fluid directing plate and said porting plates supplying pressurized fluid from an external source driving said reaction motor assembly rotating said sleeve driving said pump assembly, the latter supplying pressurized fluid pulses to said fluid chamber on one side of said diaphragm whereby the diaphragm responds to inlet conditions in said pump and draws air into said air chamber through said inlet valve and responds to fluid pressurizing conditions in said pump and compresses air in said air chamber discharging it through said exhaust valve, and a pressure relief valve in said end plate opening to bypass flow of fluid from the external source when the pressure of such fluid exceeds a safe operating range.

* * * * *